Patented Sept. 30, 1952

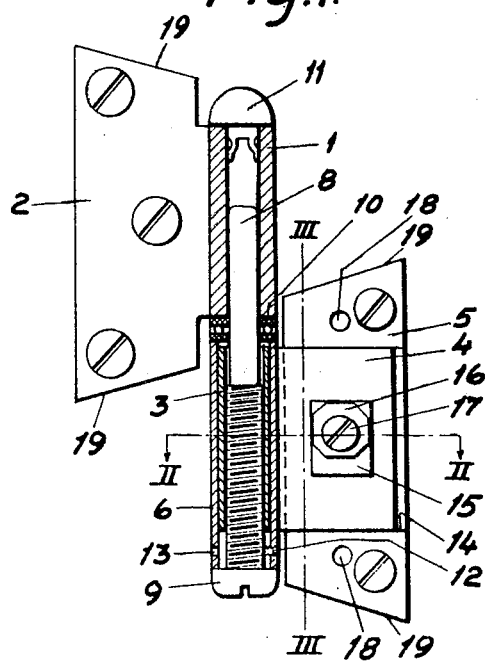
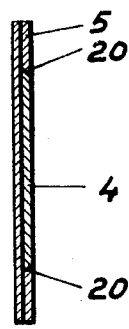
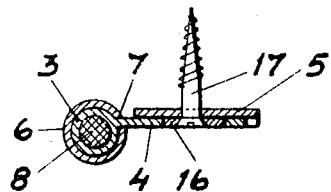
INVENTOR
GUSTAF ADRIAN WEIDELSTAM

2,611,921

UNITED STATES PATENT OFFICE 2,611,921

HINGE WITH MUTUALLY DISPLACEABLE MEMBERS FOR ADJUSTMENT THEREOF

Gustaf Adrian Weidelstam, Irisgatan, Sweden

Application June 6, 1947, Serial No. 752,911
In Sweden June 1, 1943

Section 1, Public Law 690, August 8, 1946
Patent expires June 1, 1963

4 Claims. (Cl. 16—129)

The present invention refers to an arrangement in hinges provided with two or more hinge-flanges, and the invention is principally distinguished by the feature that one hinge-flange at least is formed with two sleeves or the like displaceable relatively to one another, one of which sleeves is rigidly connected with and the other movable relatively to a mounting adapted to be secured to a window-frame, doorcase, doorpost or some other support, the hinge-pin being provided with threads and adapted to be screwed in the one sleeve, for the displacement of that sleeve which is movable relatively to the mounting and cooperates with the hinge-sleeve of the adjacent hinge-flange, and for the adjustment of the hinge in the vertical direction. One feature characteristic of the invention is that the hinge may also be made adjustable in a lateral direction. To this end, the mounting is made from two members displaceable and adjustable relatively to each other in the transverse direction of the hinge pin, one of which members is rigidly connected with the one sleeve, while the other member is arranged to be attached to the window-frame, doorcase, doorpost or the like.

A form of embodiment of a hinge according to the invention is illustrated by way of example in the accompanying drawing. Fig. 1 shows an axial section through the hinge-sleeves, and Fig. 2 is a cross section on line II—II in Fig. 1 and Fig. 3 shows a section on line III—III in Fig. 1.

The illustrated hinge comprises two hinge-flanges, the upper one of which consists in the ordinary manner of a hinge-sleeve or knuckle 1, and a hinge leaf 2 rigidly connected therewith. The other hinge-flange is formed with two knuckles or sleeves, one of which, the inner knuckle 3, is rigidly connected to a hinge leaf 4 displaceable on a mounting member 5 adapted to be secured to a window-frame, doorcase, doorpost or some other support, whereas the other outer sleeve or tubular member 6 is displaceable on the knuckle 3 and is formed, therefore, with a slit 7 (Fig. 2) having the hinge leaf 4 extending therethrough. The inner sleeve or knuckle 3 is threaded internally, and the hinge-pin 8 provided with corresponding threads over the lower portion thereof is adapted to cooperate with this sleeve. The pin is provided with a head 9 having a notch therein to receive a screw-driver. The outer sleeve or tubular member is longer than the inne one and bears with the lower end thereof on the head 9, while carrying on the upper end thereof a washer or a ball-bearing 10 having the sleeve or knuckle 1 bearing thereon, which hinge-sleeve receives the smooth upper portion of the pin. By screwing the hinge pin in the one or the other direction, the outer tubular member may thus be displaced upwardly or downwardly within certain limits, whereby the upper hinge-flange may be raised or lowered as required for subsequent adjustment caused, for instance, by the weight or deformation of the door suspended by the hinges, or through settlements of the house, and so forth.

It is evident that, as the hinge-pin 8 is rotated, it is displaced with reference to the inner sleeve or knuckle 3. Moreover, since the outer sleeve or tubular member 6 is displaceable with respect to the knuckle 3, the tubular member is raised or lowered by rotation of the hinge-pin 8. Since the upper hinge sleeve or knuckle 1 rests upon and is supported by the washer or ball-bearing 10, which, in turn, rests on the upper end of the outer sleeve or tubular member 6, it is apparent that the knuckle 1, and the hinge-leaf 2 secured thereto, are raised or lowered by rotation of the hinge-pin 8.

An advantage inherent in the construction is that a door or a window or the like may be unhooked without the necessity of raising the same, it being only necessary to screw the hinge-pin downwardly. This is in many cases of great importance in the erection of buildings, where scaffolds, ceilings or boardings form an obstruction in the unhooking of the door or window. In comparison with the ordinary hinges, which must be made as right-hand or left-hand hinges and cannot be changed from one type to the other, the hinge according to the invention has the advantage of permitting ready alteration from a left-hand hinge into a right-hand hinge, and vice versa. For this purpose the stopper 11 is removed from the one end of the sleeve 1 and inserted into the other end, the hingepin being unscrewed and screwed into the other end of the sleeve 3, if desired after the sleeve 6 has been shifted. The turning of the sleeve depends on whether the slit 7 extends all over the length of the sleeve or not. The latter sleeve also serves to cover the screw threads in all positions of the controllable distance. The advantage of this is that the appearance of the hinge will not be altered upon adjustment. In order that the hinge-pin shall not be screwed in the one or the other direction when the door or window is opened, there is provided a locking device, which in the illustrated example of embodiment consists of a set-screw 12 adapted to be screwed in a threaded hole in the lower portion of the sleeve 6 and against the hinge pin, When the hinge is changed from a left-hand hinge into a right-hand hinge, the set-screw 12 is moved to another hole 13 in the sleeve 6. The hinge leaf 4 is displaceable in a corresponding guide seat 14 formed by a recess in the mounting member 5. The edges 20 of this guide are obliquely positioned in such manner that when the hinge leaf 4, which is provided with corresponding oblique edges, is displaced in the guide, the mounting members cannot be released from each other. Hereby the advantage is obtained that, should the mounting support a door, for example, the latter need not be lifted off, when the hinge is adjusted laterally. The hinge leaf 4 has a rectangular opening 15 provided at the center thereof, said opening 15 receiving an octagonal plate 16 having an eccentrical aperture for a screw 17, by means of which the plate is retained at the mounting member 5 and the latter at the window-frame, doorcase, doorpost or the like. By loosening the screw 17 and turning the plate 16 to the desired position, it will be possible to adjust the hinge leaf 4 into different positions relatively to the mounting member or plate 5, and thus to adjust the hinge in a lateral direction. Instead of the plate 16, it will be possible to provide an eccentric with a set-screw or a locking device, whereby the eccentric may be fixed in the desired position. It is also possible to make use of a projection or screw or the like rigidly connected with the mounting member 5 and of a number of different fitting pieces adapted to be inserted between the projection or the screw and the edges of the opening 15. The hinge leaf 4 and mounting plate 5 are concealed by means of a covering plate not shown in the drawing, which is attached by means of screws projecting through the holes 18. The mounting member 5, the covering plate thereof, and the hinge leaf 2 have their lateral edges 19 extending transversely to the hinge-pin obliquely positioned in such manner that these lateral edges on being pulled outwardly are caused to bear on corresponding abutting surfaces on the window-frame, doorcase, doorpost or the like, whereby the strains on the attaching screws are reduced and the mountings are seated more securely than in the ordinary hinges. The longest edges of the mountnigs are preferably rounded, so that it will be easier to fit them neatly by first inserting the short side, after which the other side is knocked or pressed in.

The details may obviously be varied in a number of different ways in comparison with the disclosure of the description and the drawing, without the principle of the invention being departed from.

Having now described my invention, what I claim as new and desire to secure by Letters Patent is:

1. A hinge, which comprises: a hinge-pin having an extending portion and provided with a head and with screw threads on one portion of the extending portion thereof; a first hinge leaf articulating about said hinge pin and secured to a first knuckle, said first knuckle surrounding that portion of the extending portion of said hinge pin on which no screw threads are positioned; a second hinge leaf articulating about said hinge-pin, said second hinge leaf being secured to a second knuckle coaxial with said first knuckle, and being formed with an aperture therein; said second knuckle surrounding the screw-threaded portion of said hinge-pin, and being provided with screw threads on the internal portion thereof engaging said screw threads on said hinge-pin; a mounting plate adapted for securement to a frame, said mounting plate being adjustably secured to said second hinge leaf by securement means positioned in said aperture in said second hinge leaf, said securement means comprising a plate eccentrically apertured for a screw to maintain the same and mounting plate to the frame, whereby, adjustment of the eccentrically apertured plate on the screw permits sliding displacement of said second hinge leaf with respect to said mounting plate, thereby permitting relative adjustment of one with respect to the other; and a tubular member encircling said second knuckle, said tubular member being supported at its lower end by said head of said hinge-pin, while the upper end of said tubular member supports said first knuckle and said first hinge leaf secured thereto, whereby said first knuckle and said first hinge leaf may be raised or lowered, at will, by rotation of said screw-threaded hinge-pin with respect to said second knuckle.

2. A hinge as defined in claim 1, wherein said mounting plate is provided with a recessed guide seat formed therein, and said second hinge leaf is seated in said guide seat and is adapted to be laterally moved therein, in a direction substantially at right angles to said extending portion of said hinge-pin.

3. A hinge as defined in claim 1, wherein said mounting plate is dove-tailed in configuration and adapted to be seated in a correspondingly dove-tailed recess in a supporting frame member.

4. A hinge as defined in claim 1, wherein both said mounting plate and said first hinge leaf are dove-tailed in configuration, said mounting plate and said first hinge leaf being adapted to be seated in correspondingly dove-tailed recesses in supporting members to which said hinge is secured.

GUSTAF ADRIAN WEIDELSTAM.

REFERENCES CITED

The following references are of record in the file of this patent:

UNITED STATES PATENTS

| Number | Name | Date |
|---|---|---|
| 134,617 | Thompson | Jan. 7, 1873 |
| 719,747 | Christersson | Feb. 3, 1903 |
| 843,081 | Fitzgerald | Feb. 5, 1907 |
| 969,926 | Wightman | Sept. 13, 1910 |
| 1,037,807 | Thurber | Sept. 3, 1912 |
| 1,532,044 | Davies | Mar. 31, 1925 |
| 1,599,258 | Way | Sept. 7, 1926 |
| 1,607,005 | Lannom | Nov. 16, 1926 |
| 1,702,393 | Rumney | Feb. 19, 1929 |

FOREIGN PATENTS

| Number | Country | Date |
|---|---|---|
| 13,435 | Great Britain | June 16, 1898 |
| 59,583 | Sweden | Sept. 22, 1925 |
| 179,681 | Great Britain | May 16, 1922 |
| 264,503 | Italy | Apr. 30, 1929 |